United States Patent
Kaila

(10) Patent No.: US 12,367,462 B1
(45) Date of Patent: Jul. 22, 2025

(54) SYSTEMS AND METHODS FOR AUTOMATING INTERACTIONS

(71) Applicant: IT By Design, Inc., Colts Neck, NJ (US)

(72) Inventor: Sukhwinder Kaila, Colts Neck, NJ (US)

(73) Assignee: IT By Design, Inc., Colts Neck, NJ (US)

( * ) Notice: Subject to any disclaimer, the term of this patent is extended or adjusted under 35 U.S.C. 154(b) by 0 days.

(21) Appl. No.: 18/808,614

(22) Filed: Aug. 19, 2024

(51) Int. Cl.
*G06Q 10/1093* (2023.01)
*G06Q 10/0639* (2023.01)
*G06V 30/148* (2022.01)
*G10L 15/08* (2006.01)

(52) U.S. Cl.
CPC ......... *G06Q 10/1095* (2013.01); *G06Q 10/06393* (2013.01); *G06V 30/153* (2022.01); *G10L 15/083* (2013.01)

(58) Field of Classification Search
CPC ........ G06Q 10/00–50/00; G06V 10/00–40/00; G10L 13/00–99/00
USPC .............................................. 705/7.11–7.42
See application file for complete search history.

(56) References Cited

U.S. PATENT DOCUMENTS

| | | | | |
|---|---|---|---|---|
| 9,372,851 B2* | 6/2016 | Hazen | ............... | G06F 40/40 |
| 10,701,014 B2* | 6/2020 | Perazzo | ............... | H04L 51/046 |
| 10,984,387 B2* | 4/2021 | Gamon | ............... | G06Q 10/107 |
| 11,049,077 B1* | 6/2021 | Vukich | ............... | G06N 20/00 |
| 11,157,879 B2* | 10/2021 | Smith | ............... | G06Q 10/1095 |
| 11,328,259 B2* | 5/2022 | Gamon | ............... | G06Q 10/109 |
| 11,551,186 B2* | 1/2023 | Hood | ............... | G06Q 10/1095 |
| 2008/0114710 A1* | 5/2008 | Pucher | ............... | G06N 20/00 706/20 |
| 2012/0143961 A1* | 6/2012 | Jonsson | ............... | G06Q 10/1093 709/206 |
| 2013/0007648 A1* | 1/2013 | Gamon | ............... | G06Q 10/107 715/771 |
| 2016/0112362 A1* | 4/2016 | Perazzo | ............... | G06Q 10/063114 455/466 |
| 2016/0180291 A1* | 6/2016 | Beck | ............... | G06Q 10/1053 705/7.28 |
| 2017/0310716 A1* | 10/2017 | Lopez Venegas | ............... | G06Q 10/1093 |
| 2019/0222540 A1* | 7/2019 | Relangi | ............... | H04M 3/42042 |
| 2022/0215344 A1* | 7/2022 | Hood | ............... | G06Q 10/06398 |
| 2023/0059500 A1* | 2/2023 | Das | ............... | G06Q 30/0201 |
| 2024/0256918 A1* | 8/2024 | Maurer | ............... | G06N 5/022 |

* cited by examiner

*Primary Examiner* — Alan S Miller
(74) *Attorney, Agent, or Firm* — Caldwell Intellectual Property Law

(57) ABSTRACT

Described herein is an apparatus and method for automating interactions. In some embodiments, apparatus may gather system data, determine event activation data as a function of system data, execute an event by communicating event activation data to an external device, and update system data based on execution of an event.

18 Claims, 8 Drawing Sheets

SYSTEMS AND METHODS FOR AUTOMATING INTERACTIONS

FIELD OF THE INVENTION

The present invention generally relates to the field of automating interactions. In particular, the present invention is directed to systems and methods for automating interactions.

BACKGROUND

In many contexts, meetings are typically organized manually, use of templates for organization of meetings is limited, and prioritization of meetings is not systematic.

SUMMARY OF THE DISCLOSURE

In an aspect, an apparatus for automating interactions includes at least a processor; and a memory communicatively connected to the at least processor, the memory containing instructions configuring the at least processor to gather system data, wherein the system data comprises entity data; using a time datum language model, determine event activation data as a function of the system data, wherein the event activation data comprises a time datum; execute an event by communicating the event activation data to an external device; and update the system data as a function of the execution of the event.

In another aspect, a method of automating interactions includes using at least a processor, gathering system data, wherein the system data comprises entity data; using a time datum language model and at least a processor, determining event activation data as a function of the system data, wherein the event activation data comprises a time datum; using at least a processor, executing an event by communicating the event activation data to an external device; and using at least a processor, updating the system data as a function of the execution of the event.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automating interactions. In some embodiments, a system may gather data related to one or more entities to participate in an interaction. As described further herein, system may use this data to determine properties of an interaction, then may communicate properties of an interaction to an external device. A system may also update the data related to a meeting participant as the event is completed.

Figure 1:
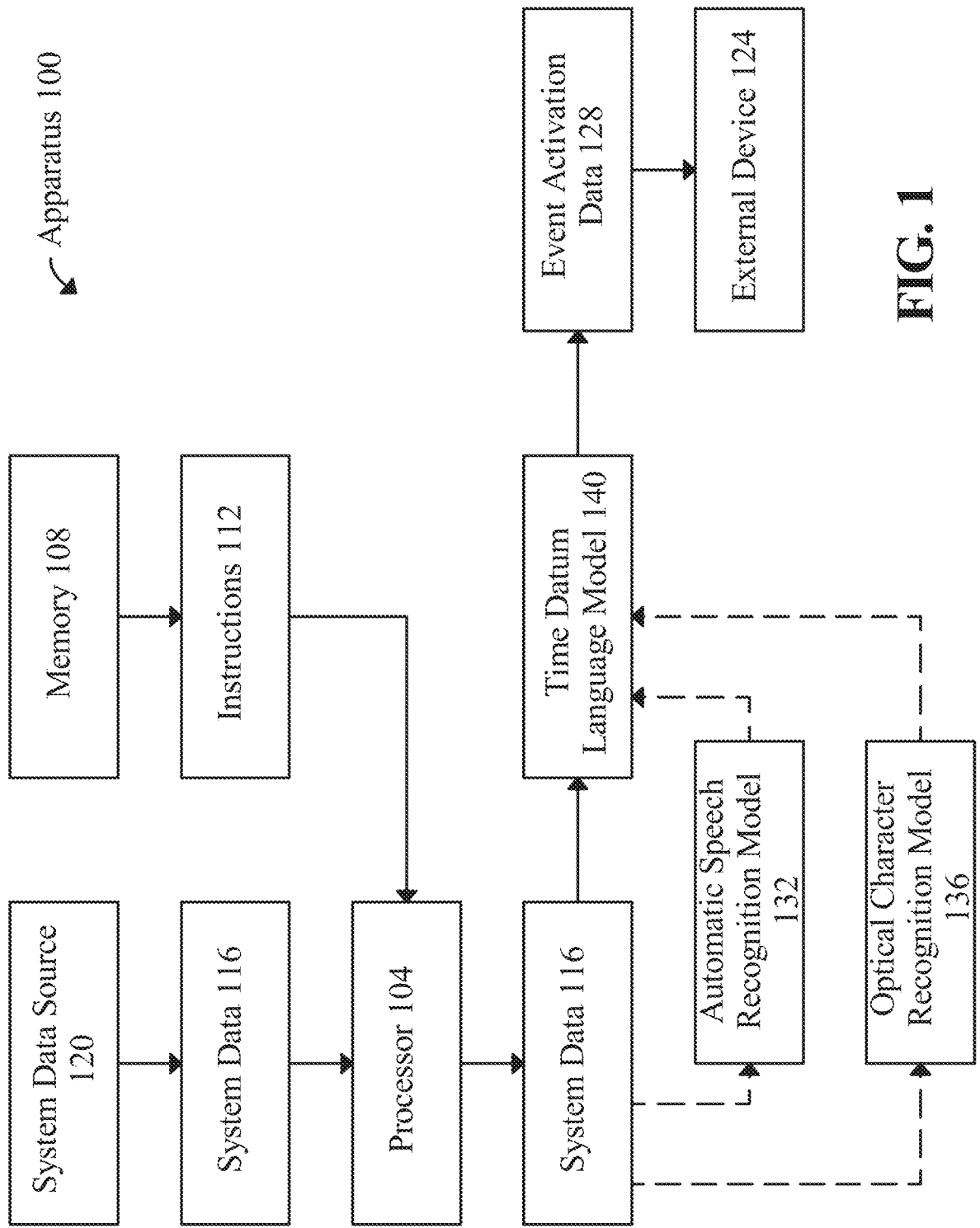
FIG. 1 is a diagram depicting an exemplary apparatus for automating interactions.

Referring now to FIG. 1, an exemplary embodiment of an apparatus 100 for automating interactions is illustrated. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may gather system data 116. In some embodiments, apparatus 100 may include at least a processor 104 and memory 108 communicatively connected to the at least processor 104, the memory 108 containing instructions 112 configuring the at least processor 104 to gather system data 116. As used herein, "system data" is data representing a state of a system. In some embodiments, system data may include a template agenda and/or a template agenda selection. In some embodiments, an entity may select a template agenda from a list. In some embodiments, an entity may input desired features for a template agenda. As described further below, template agendas and/or template agenda selections may be used to determine event activation data 128.

Still referring to FIG. 1, in some embodiments, system data may include entity data. As used herein, "entity data" is data associated with a particular entity. In some embodiments, entity may include an individual. For example, entity may include an employee, contractor, manager, and the like. In some embodiments, entity data may include an interaction rating. An interaction rating may include, in a non-limiting example, a rating by an individual that interacts with an entity, such as a customer or client, of the service of an entity or of their interaction. Interaction ratings may include customer satisfaction ratings. In some embodiments, entity data may include a numerical value based on interaction ratings associated with a particular entity. In some embodiments, such a numerical value may include an average or median interaction rating associated with a particular entity. In some embodiments, such a numerical value may include a ranking of a particular entity's average or median interaction rating compared to a broader set of entities. In some embodiments, such a numerical value may include the proportion of a particular entity's interaction ratings that are above or below a certain threshold. In a non-limiting example, a numerical value may include the proportion of a particular entity's interaction ratings that are greater than or equal to 9 on a 1-10 scale. In some embodiments, such a numerical value may be compared with a threshold. In a non-limiting example, a numerical value may include the proportion of a particular entity's interaction ratings that are greater than or equal to 9 on a 1-10 scale, and this may be compared to a threshold of 80% (for example, it may be desired that at least 80% of an entity's interaction ratings are 9 or higher). As described further below, interaction ratings and/or numerical values associated with interaction ratings may be used to determine event activation data 128, and/or used as a measure of entity performance. In some embodiments, interaction ratings may include or may be associated with a narrative component. In a non-limiting example, an interface for inputting an interaction rating may include a text box for describing an interaction. In some embodiments, a language model may be used to interpret such a narrative component, and outputs of this language model may be included in entity data. In a non-limiting example, a language model may determine the degree to which words are similar to the word "rude" and if sufficient numbers of narrative components include words similar to the word "rude" then this may be included in entity data. Language models are described below.

Still referring to FIG. 1, in some embodiments, entity data may include a recognition datum. A recognition datum may include a datum associated with recognition by a particular entity of other entities. A recognition datum may include a datum associated with recognition received by a particular entity from other entities. As a non-limiting example, a system may provide entities with a function for recognizing or commending each other, and a recognition datum may include a measure of the number of times a particular entity was recognized and/or the number of times a particular entity recognized a peer. In a similar non-limiting example, such a system may allow entities to attach a value to their recognition, such as a number of points. In this example, a recognition datum may include a measure of the number of points accrued by a particular entity and/or the number of points given to peers by a particular entity. In some embodiments, a recognition datum may be ranked and/or compared to recognition datum associated with other entities. As described further below, recognition datum and/or rankings or comparisons associated with interaction ratings may be used to determine event activation data 128, and/or used as a measure of entity performance and/or entity engagement.

Still referring to FIG. 1, in some embodiments, entity data may include a key performance indicator (KPI) associated with entity. KPIs may be determined based on entity's role. As non-limiting examples, KPIs relevant to entities tasked with resolving information technology tickets may include first call resolution rate, average tickets closed per day, utilization rate, customer satisfaction score, response rate, and the like. In some embodiments, KPIs may be selected such that they are associated with high quality performance in an entity's role and are quantifiable and concrete. As described further below, KPIs may be used to determine event activation data 128, and/or used as a measure of entity performance. In some embodiments, automated systems may be used to determine KPIs. Methods of collecting and manipulating such data will depend on the situation. Methods of collecting and manipulating data described herein, such as optical character recognition, automatic speech recognition, and language models, may be applied to determination of KPIs.

Still referring to FIG. 1, in some embodiments, entity data may include event notes and/or a transcript of an event in which entity was a participant. In some embodiments, an event may be recorded, and such a recording may be processed using an automatic speech recognition model 132. In some embodiments, automatic speech recognition model 132 may output an event transcript in a non-audio format, such as a text format. In some embodiments, optical character recognition model 136 may be used to convert event notes, such as handwritten event notes, to another format, such as a text format. In some embodiments, event notes and/or an event transcript may be input into a language model in order to interpret the event notes and/or transcript. Optical character recognition, automatic speech recognition systems and language models are described below. As described further below, event notes and/or transcripts may be used to determine event activation data 128.

Still referring to FIG. 1, in some embodiments, entity data may include entity calendar data. For example, entity data may include data indicating when entity is considered available and data indicating when entity is considered busy. System data may include entity calendar data, as well as calendar data from others, such as from other managers, employees, or contractors. As described further below, calendar data may be used to determine event activation data 128.

Still referring to FIG. 1, in some embodiments, entity data may include a user retention datum. User retention datum may include a datum that describes statistics on retention of entities that share one or more features with a particular entity. As a non-limiting example, if an entity of interest is an accountant located in a particular New York office, then user retention datum may include data as to the rate of accountants in that New York office leaving. As described further below, user retention datum may be used to determine event activation data 128.

Still referring to FIG. 1, system data 116 may be received from a system data source 120. As used herein, a "system data source" is a process, entity, user, memory, or data structure containing system data. In some embodiments, system data source 120 may include one or more user devices, databases, computing devices, and/or users. In non-limiting examples, user devices may include smartphones, smartwatches, tablets, and computers. In some embodiments, a system data source 120 may include a physical or digital form such as a form on a website or in an application. Exemplary forms include forms for inputting KPIs. As another non-limiting example, a system data source 120 may include a computing device configured to receive system data 116 using digital tracking, such as gathering information using a device fingerprint that allows a user device to be tracked across the internet. As a non-limiting example, a device fingerprint may allow a user device to be tracked across a technology platform for resolving information technology tickets. In some embodiments, system data 116 may be received from a third party. In a non-limiting example, a third party may operate a database including system data 116, processor 104 may request system data 116 from the database using an application programming interface (API), and processor 104 may receive from the database, or a computing device associated with the database, system data 116.

Still referring to FIG. 1, system data 116 may be input through an interface. An interface may include a graphical user interface (GUI). An interface may include a touchscreen GUI interface. An interface may include a computing device configured to receive an input from a user. In some embodiments. an interface may be configured to prompt a user for an input. In a non-limiting example, an interface may request that a user upload event notes.

Still referring to FIG. 1, in some embodiments, system data 116 may be converted into a different form. Data formats may be converted in a variety of ways, such as without limitation, using a speech to text function or using optical character recognition. In some embodiments, system data 116 may be converted into a different form such that it is in a form appropriate for input into a function. As a non-limiting example, a language model may only accept inputs in a particular format, and system data 116 may be converted into that format such that it may be effectively input into such a language model.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word. Such a machine learning model may include a neural network. Such a machine learning model may include a deep learning network, such as one with 2 or more internal layers. Such a machine learning model may be implemented as described in the context of language models.

Still referring to FIG. 1, in some embodiments, system data 116 may be processed using optical character recognition model 136. In some embodiments, optical character recognition model 136 may convert image data to a different data form, such as a text document. In some embodiments, an image may be categorized as a document containing an image of text prior to such document being input into optical character recognition model 136. In some embodiments, such categorization may be done using a classifier. In some embodiments, such categorization may be done using a text recognition classifier. Text recognition classifier may be trained on a dataset including image data, associated with whether or not the image data includes text. Text recognition classifier may accept as an input image data and may output a determination as to whether the input image depicts text. In some embodiments, optical character recognition model 136 may be applied to a file that includes an image element and may also include additional elements. For example, optical character recognition model 136 may be applied to a PDF document.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from system data 116 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of system data 116. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to system data 116 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of system data 116. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of system data 116.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of system data 116. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes system data 116. Since the adaptive classifier may have learned something useful a little too late to recognize characters on the first pass, a second pass is run over the system data 116. Second pass may include adaptive recognition and use characters recognized with high confidence on the first pass to recognize better remaining characters on the second pass. In some cases, two-pass approach may be advantageous for unusual fonts or low-quality system data 116. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of system data 116. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, system data 116 may be processed using automatic speech recognition model 132. In some embodiments, automatic speech recognition may require training (i.e., enrollment). In some cases, training an automatic speech recognition model may require an individual speaker to read text or isolated vocabulary. In some cases, speech training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within system data 116, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, a language model may be used to process system data 116. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in system data 116 by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from system data 116 with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a feature of an entity. In a non-limiting example, a string containing the word "rude" may be associated with a feature of an entity's interaction with a user. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in system data 116 using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in system data 116 using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and or run using processor 104, or another computing device. Language classification training data may create associations between any type of language element in any format and other type of language element in any format. Additionally, or alternatively, language classification training data may associate language element input data to a feature related to an entity. For example, language classification training data may associate occurrences of the syntactic elements "didn't," "solve," and "problem," in a single sentence with the feature of an entity not having solved a problem.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, apparatus 100 may determine event activation data 128 as a function of system data 116. In some embodiments, apparatus 100 may include at least a processor 104 and memory 108 communicatively connected to the at least processor 104, the memory 108 containing instructions 112 configuring the at least processor 104 to determine event activation data 128 as a function of system data 116.

Still referring to FIG. 1, as used herein, "event activation data" is data describing a particular event. In some embodiments, event activation data may include a time datum. As used herein, a "time datum" is a datum describing when a particular event is to take place. In a non-limiting example, an event described by event activation data such as time datum may include a meeting. In a non-limiting example, an event described by event activation data such as time datum may include a 1:1 meeting. In a non-limiting example, an event described by event activation data such as time datum may include a 1:1 meeting between a manager and an employee or contractor overseen by the manager.

Still referring to FIG. 1, time datum may include one or more of a start time for an event, an end time for an event, a duration of an event, and the like. In some embodiments, time datum may be set based on a user input. In some embodiments, time datum may be set such that events occur at regular intervals. As a non-limiting example, events may be set to occur every 2 weeks. In some embodiments, time datum may be set and/or modified based on a calendar datum of an event participant. As a non-limiting example, time datum may be set such that the event is scheduled at a time when all event participants are available.

Still referring to FIG. 1, in some embodiments, time datum may be set and/or modified based on user retention datum. In a non-limiting example, if user retention datum indicates that users that share features with an entity of interest have been leaving at a rate above a threshold, then time datum may be modified such that events described herein involving the entity of interest occur more frequently. This may aid, for example, in retaining entities more likely to leave.

Still referring to FIG. 1, in some embodiments, time datum may be set and/or modified based on interaction rating, a narrative element associated with an interaction rating, a numerical value associated with an interaction rating, a recognition datum, a KPI, and/or another measurement of performance and/or engagement. As non-limiting examples, processor may determine time datum such that an event occurs sooner if average interaction rating, a KPI, and/or another measurement of performance is below a threshold. In another non-limiting example, processor may determine time datum such that an event involving an entity of interest occurs after a longer period of time if interaction rating indicates that the entity is very engaged in the workplace (which may be measured based on, for example, the number of recognitions the entity gives and receives).

Still referring to FIG. 1, in some embodiments, time datum may be determined using a time datum modification machine learning model. Time datum modification machine learning model may be trained using a supervised learning algorithm. Time datum modification machine learning model may be trained on a dataset including one or more of interaction ratings, narrative elements associated with interaction ratings, numerical values associated with interaction ratings, recognition data, KPIs, and additional measurements of performance and/or engagement. Such data may be associated with data indicating whether and/or when an associated entity left. Time datum modification machine learning model may accept as an input one or more of interaction ratings, narrative elements associated with interaction ratings, numerical values associated with interaction ratings, recognition data, KPIs, and additional measurements of performance and/or engagement, and may output a time datum and/or a datum used to determine time datum. In some embodiments, an item from the list consisting of an interaction rating, a recognition datum, and a key performance indicator may be input into a time datum modification machine learning model. For example, time datum modification machine learning model may be trained on a dataset including historical recognition data, where each element of historical recognition data is associated with whether associated entity left within 6 months. In this example, time datum modification machine learning model may accept as an input recognition datum and may output a determination as to whether an associated entity is likely to leave within the next 6 months or how likely an associated entity is likely to leave within the next 6 months. Such a determination may be used to determine time datum. For example, a determination of a high likelihood that an entity of interest leaves within the next 6 months may cause processor to determine time datum such that events involving entity of interest occur more frequently. In some embodiments, training data for time datum modification machine learning model may be gathered from sources such as historical entity data from records kept by employer, assembling data from several such employers to form a larger data set, and gathering data from users of a digital system such as a system described herein. In some embodiments, time datum modification machine learning model may be used to determine time datum if another process, such as time datum language model, does not produce a time datum. For example, if no event transcript or event notes are available, or if they do not include timing for a follow up event, then time datum modification machine learning model may be used.

Still referring to FIG. 1, in some embodiments, time datum may be set as a function of event notes and/or a transcript of an event. In some embodiments, time datum may be set based on the output of time datum language model 140. In some embodiments, time datum language model may be trained to recognize language suggesting that an individual wishes to schedule another event at a particular time. Time datum language model may be trained on a dataset including historical event notes and/or historical event transcripts, associated with whether and/or when an event participant wished to schedule another event for. Time datum language model may accept as an input event notes and/or an event transcript and may output time datum. For example, time datum language model may interpret an event transcript in which the event participants agreed to meet at a particular time and may output a time datum such that an event is scheduled for that time.

Still referring to FIG. 1, in some embodiments, time datum language model 140 may include a classifier trained to recognize whether an event participant expressed a desire to set up a follow up event. Such a time datum language model 140 may be trained on a dataset including historical event notes and/or historical event transcripts, associated with whether a participant expressed a desire to set up a follow up event. Such a time datum language model 140 may accept as an input event notes and/or an event transcript and may output a determination as to whether a participant expressed a desire to set up a follow up event. In some embodiments, if participant expressed a desire to set up a follow up event, then processor may read event notes and/or an event transcript in order to determine time datum. For example, processor may recognize numbers or text formatted as times or dates and determine time datum as a function of those times or dates.

Still referring to FIG. 1, in some embodiments, a pre-processing step may be applied to data before it is input into time datum language model 140. As a non-limiting example, a transcript of an event may be prepared from an audio recording of event using automatic speech recognition model 132. In another non-limiting example, optical character recognition model 136 may be applied to an image of handwritten event notes to convert the image into a text file, and time datum language model 140 may be applied to such a text file.

Still referring to FIG. 1, in some embodiments, event activation data may include an event agenda. In some embodiments, an event agenda may include system data. In some embodiments, an event agenda may include a measure of entity performance and/or entity engagement. As a non-limiting example, if an entity has a low average number of tickets closed per day, then this may be included or highlighted in an event agenda where that entity is a participant.

Still referring to FIG. 1, in some embodiments, event agendas may be determined based on templates. In some embodiments, event agendas may be customized based on entity role. For example, average number of tickets closed per day may be a sensible metric for measuring performance in some entity roles but not others. In this example, average number of tickets closed per day may be included in a performance section of a template for the applicable entities. In some embodiments, which template for event agenda is used may be determined using an event template machine learning model. Event template machine learning model may include a classifier. Event template machine learning model may include a neural network. In some embodiments, event template machine learning model may be trained on historical system data, such as historical entity performance and/or historical entity engagement data, associated with which template was applied to a related historical event. In some embodiments, event template machine learning model may accept as an input system data. In some embodiments, event template machine learning model may accept as inputs one or more of a key performance indicator, an interaction datum, and an entity role. Event template machine learning model may output a template and/or a datum identifying a template. In some embodiments, system data may be processed in preparation for input into event template machine learning model. For example, processor may determine from the entity performance data which performance metric an entity is farthest from the mean on, and/or which performance metric an entity is farthest from the mean on in a particular direction; the result may be input into event template machine learning model. In another example, event template machine learning model may only accept inputs in a particular format, and processor may modify data such that it is in the appropriate format.

Still referring to FIG. 1, in some embodiments, apparatus 100 may execute an event by communicating the event activation data 128 to external device 124. In some embodiments, apparatus 100 may include at least a processor 104 and memory 108 communicatively connected to the at least processor 104, the memory 108 containing instructions 112 configuring the at least processor 104 to execute an event by communicating the event activation data 128 to external device 124.

Still referring to FIG. 1, in some embodiments, external device may include a computing device associated with a server. In some embodiments, such a server may store data for a calendar application. In some embodiments, event activation data 128 is transmitted to a computing device associated with a calendar application server such that the computing device is configured to create a calendar event for an event at a time associated with event activation data 128. For example, such a communication may configure computing device associated with calendar application server to create a calendar event with a start and end time specified by event activation data 128. In some embodiments, event activation data 128 is transmitted to a computing device associated with a calendar application server such that the computing device is configured to create and/or update a calendar event to include an event agenda associated with event activation data 128.

Still referring to FIG. 1, in some embodiments, external device may include a user device. In some embodiments, transmitting event activation data 128 to a user device may include configuring the user device to display a visual element that a user can interact with to send an event invite for a time associated with event activation data 128. In some embodiments, transmitting event activation data 128 to a user device may include configuring the user device to display a visual element depicting an event agenda associated with event activation data 128. Such a communication may include a visual element and/or a visual element data structure. Visual elements and visual element data structures are described below.

Still referring to FIG. 1, in some embodiments, apparatus 100 may update system data 116 as a function of execution of event. In some embodiments, apparatus 100 may include at least a processor 104 and memory 108 communicatively connected to the at least processor 104, the memory 108 containing instructions 112 configuring the at least processor 104 to update system data 116 as a function of execution of event.

Still referring to FIG. 1, in some embodiments, apparatus 100 may receive event notes from an event participant and/or may record an event and convert the recording into a transcript in a format suitable for input into a language model. In some embodiments, such event notes and/or transcript may be added to system data 116. As described above, apparatus 100 may determine event activation data for a further event as a function of such event notes and/or transcript.

Still referring to FIG. 1, in some embodiments, an event described herein may include a 1:1 meeting. In some embodiments, an entity described herein may be a participant in an event described herein. In some embodiments, an event described herein may include as participants a first entity and a second entity. In some embodiments, first entity may include an entity that entity data is associated with. As non-limiting examples, first entity may include an employee or contractor that is described by entity data. In some embodiments, second entity may include a manager or supervisor that oversees first entity. In some embodiments, event includes a 1:1 meeting between a first entity and a second entity, wherein the first entity oversees the second entity in a workplace.

Still referring to FIG. 1, in some embodiments, apparatus 100 may communicate to an external device a datum such as event activation data 128, where such communication configures the external device to display a visual element to a user. In some embodiments, apparatus 100 may communicate to an external device a visual element data structure. For example, communication of event activation data 128 may include communication of a visual element data structure. In some embodiments, an external device includes a user device.

Still referring to FIG. 1, in some embodiments, a visual element data structure may include a visual element. In some embodiments, a visual element data structure may include a rule for displaying visual element. In some embodiments, a visual element data structure may be determined as a function of event activation data 128. In some embodiments, a visual element data structure may be determined as a function of an item from the list consisting of system data 116, event activation data 128, interaction ratings, narrative elements associated with interaction ratings and/or numerical values associated with interaction ratings, recognition datum, KPI, event notes, event transcript, time datum, and event agenda. In a non-limiting example, a visual element data structure may be generated such that visual element describing or highlighting event activation data 128 is displayed to a user such as entity. As a non-limiting example, a visual element may display a time datum associated with a proposed event.

Figure 6:
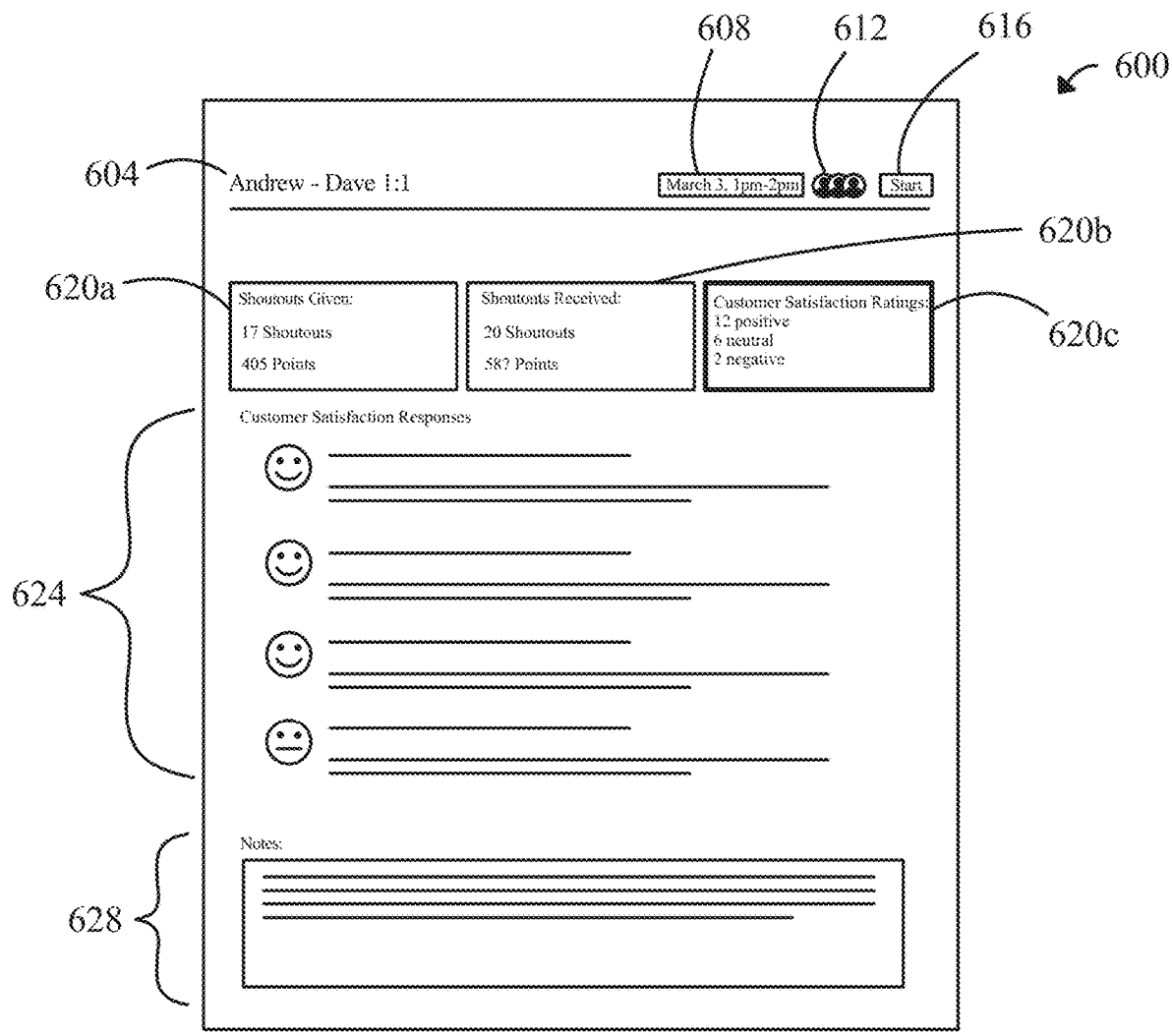
FIG. 6 is a diagram depicting an exemplary GUI.
Figure 7:
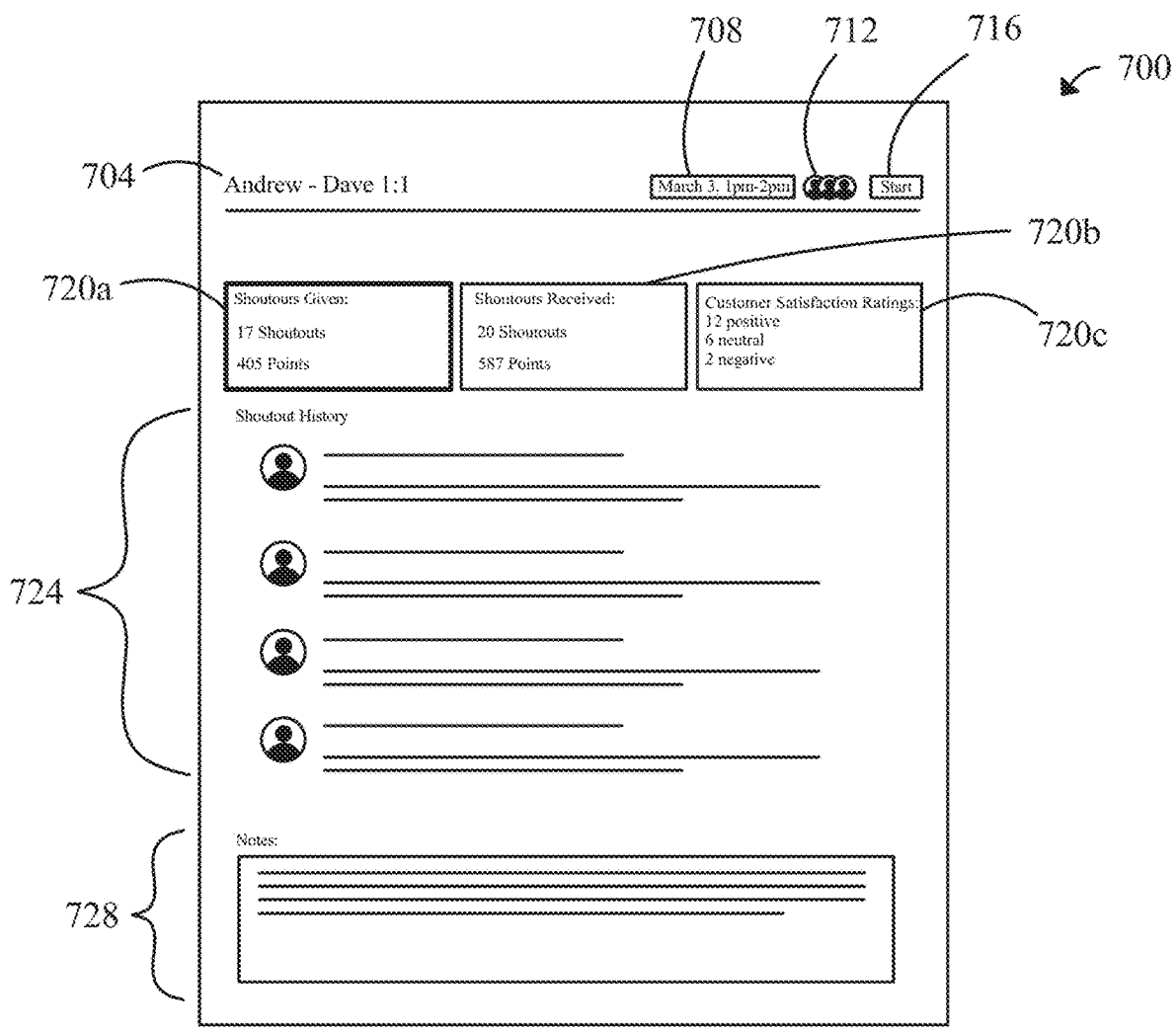
FIG. 7 is a diagram depicting an exemplary GUI.

Still referring to FIG. 1, in some embodiments, visual element may include one or more elements of text, images, shapes, charts, particle effects, interactable features, and the like. Non-limiting examples of visual elements that include these features are depicted in FIG. 6, FIG. 7, and are described with reference to those figures.

Still referring to FIG. 1, a visual element data structure may include rules governing if or when visual element is displayed. In a non-limiting example, a visual element data structure may include a rule causing a visual element describing event activation data 128 to be displayed when a user selects event activation data 128 using a GUI.

Still referring to FIG. 1, a visual element data structure may include rules for presenting more than one visual element, or more than one visual element at a time. In an embodiment, about 1, 2, 3, 4, 5, 10, 20, or 50 visual element are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). As a non-limiting example, interaction ratings may be categorized together. A visual element data structure may rank data or assign numerical values to them. As a non-limiting example, interaction ratings for which a narrative element was provided may be ranked higher than other interaction ratings. A numerical value may, for example, measure the degree to which a first datum is associated with a category or with a second datum. As a non-limiting example, a numerical value may measure the degree to which an interaction rating is "positive" or "negative." A visual element data structure may apply rules based on a comparison between a ranking or numerical value and a threshold. As a non-limiting example, a rule may indicate that positive interaction ratings are to be colored green and negative ones are to be colored red. Rankings, numerical values, categories, and the like may be used to set visual element data structure rules. Similarly, rankings, numerical values, categories, and the like may be applied to visual elements, and visual elements may be applied based on them. As a non-limiting example, several elements of data measuring performance of an entity may be determined, and a single one may be highlighted if it is an outlier from an average for a larger pool of entities.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, apparatus 100 may determine visual element. In some embodiments, apparatus 100 may include at least a processor 104 and a memory 108 communicatively connected to the at least processor 104, the memory 108 containing instructions 112 configuring the at least processor 104 to determine visual element.

Still referring to FIG. 1, in some embodiments, apparatus 100 may display visual element to user such as entity. In some embodiments, apparatus 100 may include at least a processor 104 and a memory 108 communicatively connected to the at least processor 104, the memory 108 containing instructions 112 configuring the at least processor 104 to display visual element to user such as entity.

Still referring to FIG. 1, in some embodiments, apparatus 100 may transmit visual element data structure to user device. In some embodiments, apparatus 100 may include at least a processor 104 and a memory 108 communicatively connected to the at least processor 104, the memory 108 containing instructions 112 configuring the at least processor 104 to transmit visual element data structure to user device. In some embodiments, visual element data structure may configure user device to display visual element. In some embodiments, visual element data structure may cause an event handler to be triggered in an application of user device such as a web browser. In some embodiments, triggering of an event handler may cause a change in an application of user device such as display of visual element.

Still referring to FIG. 1, in some embodiments, apparatus 100 may transmit visual element to a display. A display may communicate visual element to user such as entity. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user such as entity to input data into the display. Interactive elements may be configured to enable interaction between a user and a computing device. In some embodiments, a visual element data structure is determined as a function of data input by user such as entity into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a system data data structure may include a string value representing an element of text from an interaction transcript. In some embodiments, data in a data structure may be organized in a linked list, tree, array, matrix, tenser, and the like. In a non-limiting example, interaction ratings may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, a time datum data structure may be read and used to communicate with an external device. In another non-limiting example, a time datum data structure may be changed based on input from a user.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Figure 2:
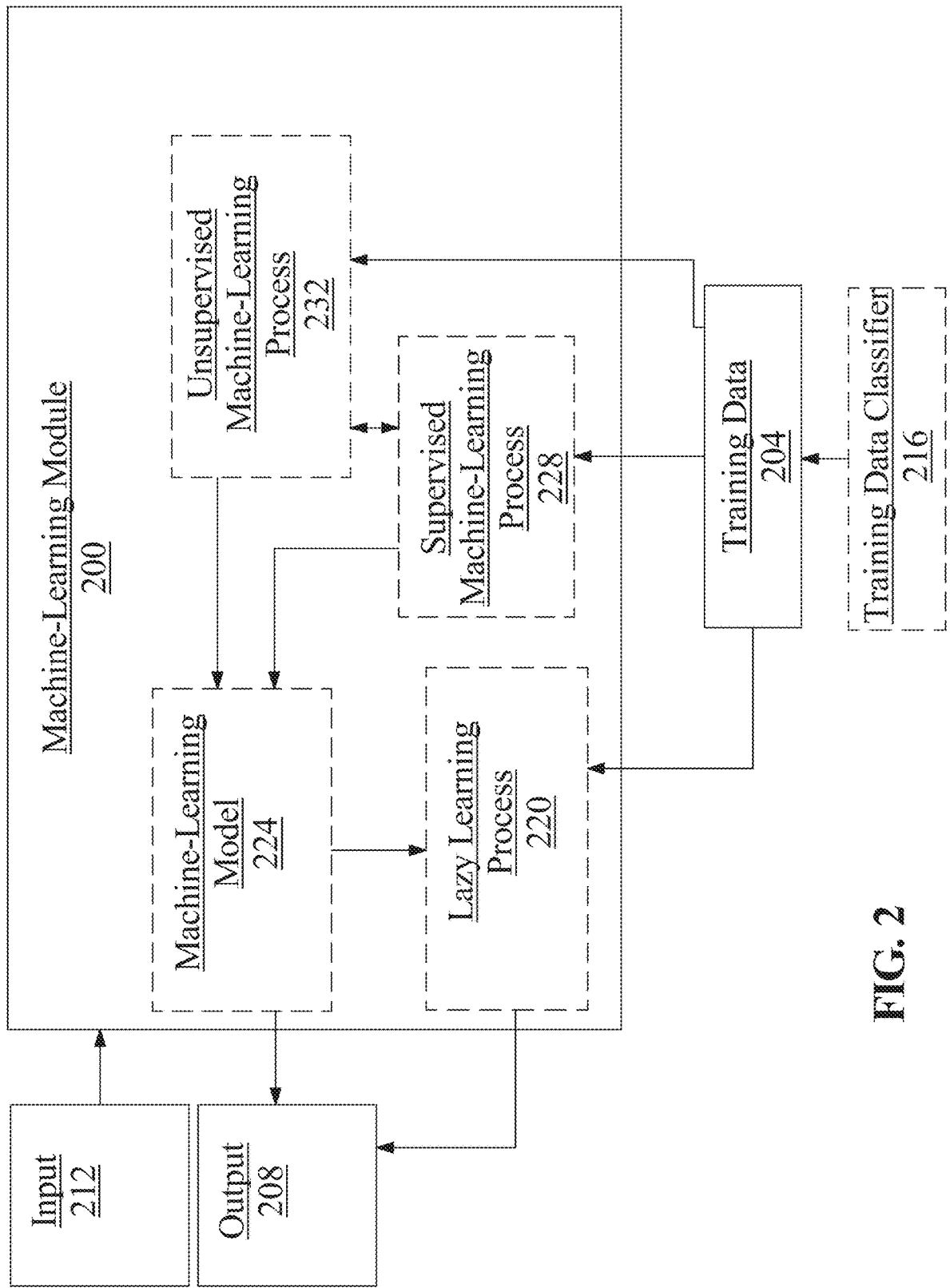
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, an input may include an event transcript and an output may include a time datum.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to whether or not an entity of interest is likely to leave within the next 6 months.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include handwritten characters as described above as inputs, text matching the handwritten characters as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
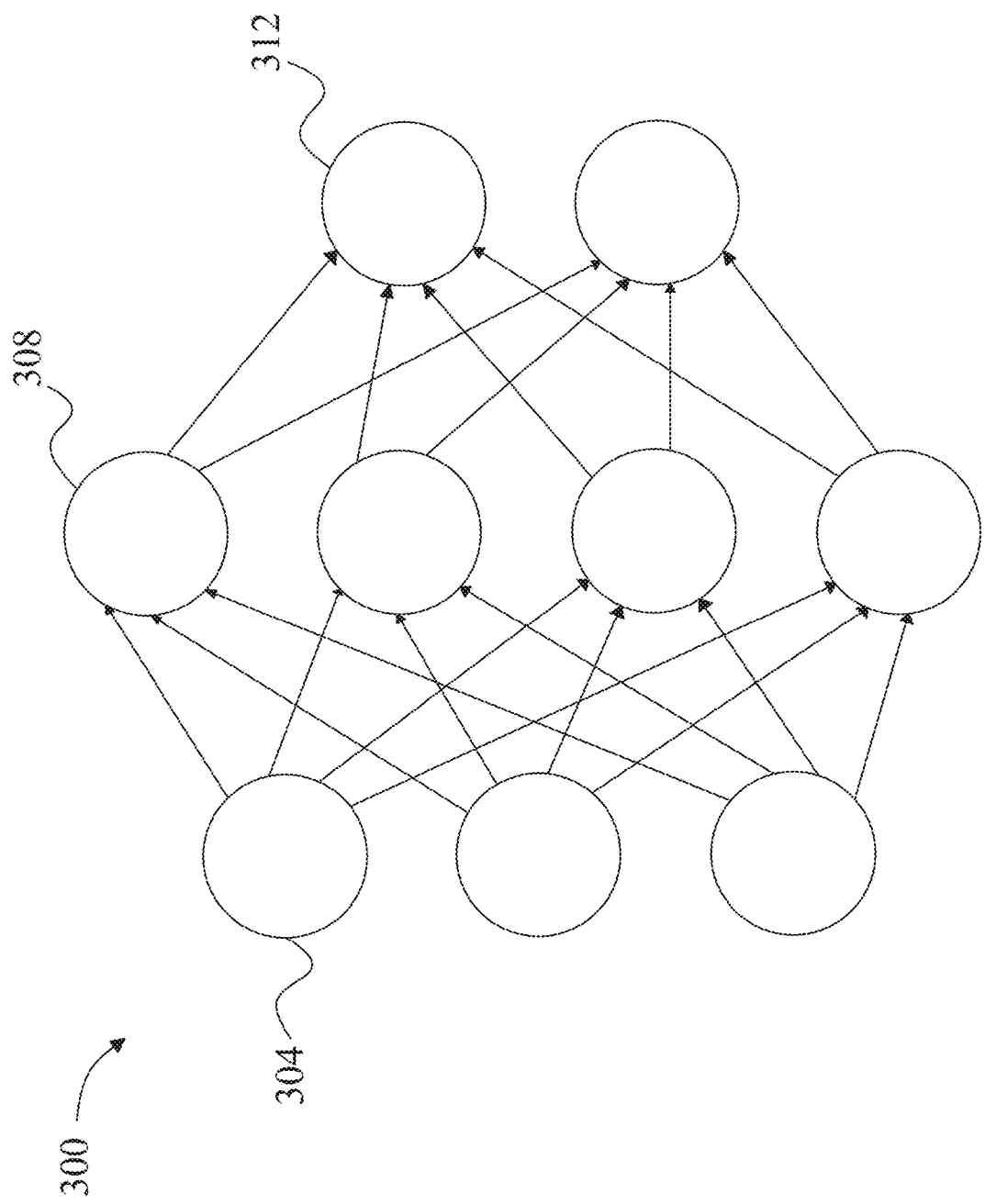
FIG. 3 is a diagram depicting an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
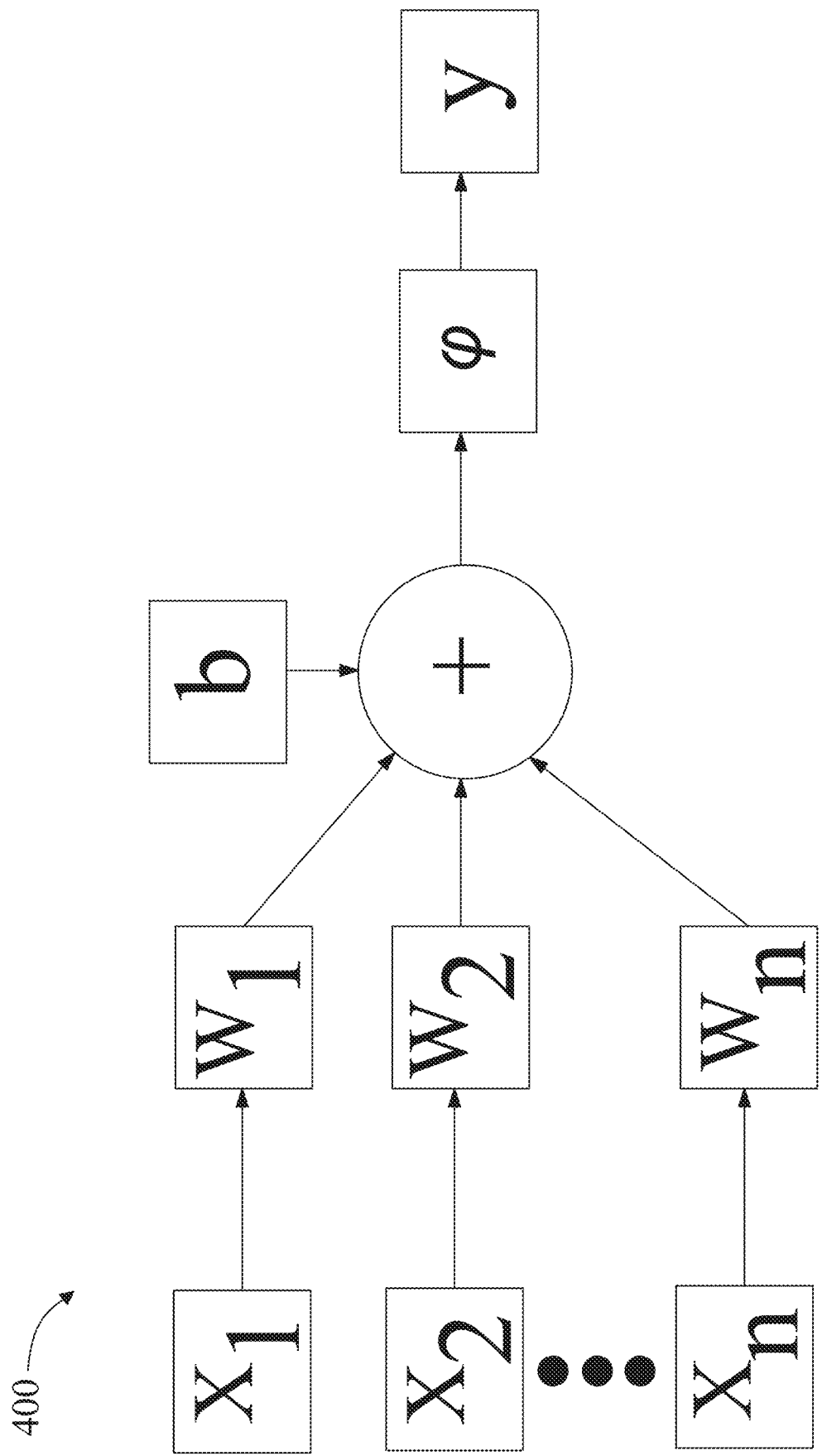
FIG. 4 is a diagram depicting an exemplary neural network node.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
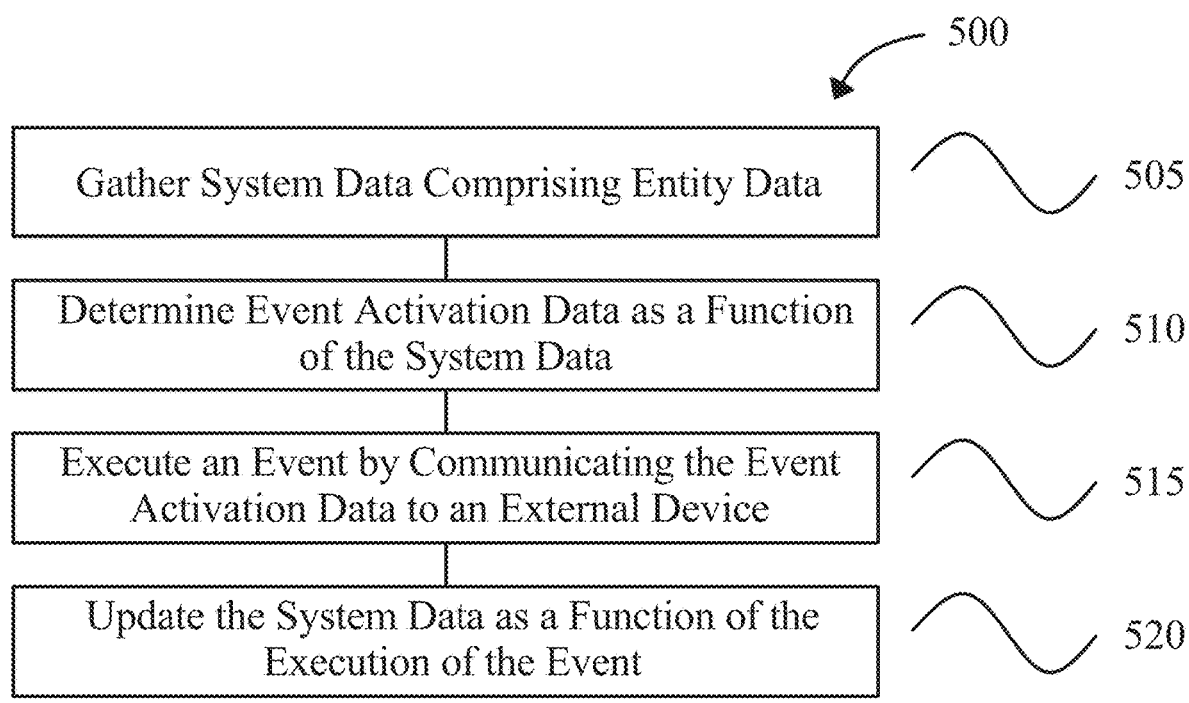
FIG. 5 is a diagram depicting an exemplary method of automating interactions.

Referring now to FIG. 5, an exemplary embodiment of a method 500 of automating interactions is illustrated. In some embodiments, a method may be implemented as described above with reference to FIG. 1. In some embodiments, a method may be implemented using at least a processor.

Still referring to FIG. 5, method 500 may include gathering system data. In some embodiments, system data may include entity data. In some embodiments, system data may include an interaction rating associated with an entity. In some embodiments, method 500 further includes determining event activation data as a function of the interaction rating. In some embodiments, system data may include a recognition datum associated with an entity. In some embodiments, method 500 further includes determining event activation data as a function of the recognition datum.

Still referring to FIG. 5, method 500 may include using a time datum language model, determining event activation data as a function of the system data. In some embodiments, event activation data may include a time datum. In some embodiments, determining event activation data as a function of the system data is done as a function of a datum selected from the list consisting of a user retention datum, a recognition datum, a measure of entity performance, and a measure of entity engagement. In some embodiments, system data may include a recording of a prior event; and determining event activation data may include inputting the recording into an automatic speech recognition model; receiving from the automatic speech recognition model a transcript of the prior event; and determining a time datum language model input as a function of the transcript of the prior event. In some embodiments, system data may include an image of event notes from a prior event; and determining event activation data may include inputting the event notes into an optical character recognition model; receiving from the optical character recognition model the event notes from the prior event in a non-image format; and determining a time datum language model input as a function of the event notes from the prior event in a non-image format.

Still referring to FIG. 5, method 500 may include executing an event by communicating the event activation data to an external device. In some embodiments, external device may include a computing device associated with an event server, wherein communicating the event activation data to the external device may include configuring the external device to create an event datum at a time associated with the event activation data. In some embodiments, external device may include a user device, wherein communicating the event activation data to the external device may include configuring the external device to display a visual element that a user can interact with to send an invite at a time associated with the event activation data. In some embodiments, determining event activation data may include inputting into an event template machine learning model an item from the list consisting of a key performance indicator, an interaction datum, and an entity role; and receiving from the event template machine learning model a datum identifying an agenda template.

Still referring to FIG. 5, method 500 may include updating the system data as a function of the execution of the event.

Still referring to FIG. 5, method 500 may further include, if time datum is not produced by time datum language model, inputting an item from the list consisting of an interaction rating, a recognition datum, and a key performance indicator into a time datum modification machine learning model; and receiving from the time datum modification machine learning model the time datum. In some embodiments, the event includes a 1:1 meeting between a first entity and a second entity, wherein the first entity oversees the second entity in a workplace.

Now referring to FIG. 6, in some embodiments, an exemplary GUI 600 is depicted. In some embodiments, apparatus 100 and/or method 500 may be implemented using a GUI such as GUI 600. GUI 600 may be associated with a particular event. GUI 600 may include data to be discussed at an event. In some embodiments, GUI 600 may specify an event title 604. In some embodiments, GUI 600 may specify a time datum 608. In some embodiments, GUI 600 may specify event participants 612. In some embodiments, GUI 600 may include an interactive element for starting an associated event 616. In some embodiments, GUI 600 may include visual elements and/or interactive elements 620a, 620b, and 620c describing system data such as entity data. In some embodiments, an interactive element such as 620a or 620b may describe a recognition datum, such as shoutouts given, shoutouts received, and/or a value associated with shoutouts given and/or received. In some embodiments, GUI 600 may describe a measure of entity performance such as an interaction rating, statistics associated with interaction ratings, and/or narrative elements associated with an interaction rating, as in 620c. In some embodiments, one or more elements of GUI 600 may be selected. In a non-limiting example, an interactive element such as 620c may be selected, and additional details 624 relevant to element 620c may be displayed. In some embodiments, GUI 600 may include an interactive field 628 for entity input such as event notes.

Still referring to FIG. 6, in a non-limiting example, GUI 600 may include shoutouts given and received, as well as CSAT reviews received. In this example, an entity may see key indicators for each data point, including the number of shoutouts given and received, the number of points given and received, and the trend from the previous meeting. In this example, an entity may also see the total number of CSAT reviews and a breakdown of positive, neutral, and negative reviews. In this example, clicking on any of the key indicators may display more detailed data and list all shoutouts given and received, as well as all CSAT reviews. In some embodiments, GUI 600 may include an activity tab displaying data representing all activity for the user that has occurred since the last event.

Now referring to FIG. 7, in some embodiments, an exemplary GUI 700 is depicted. In some embodiments, apparatus 100 and/or method 500 may be implemented using a GUI such as GUI 700. GUI 700 may be associated with a particular event. GUI 700 may include data to be discussed at an event. In some embodiments, GUI 700 may specify an event title 704. In some embodiments, GUI 700 may specify a time datum 708. In some embodiments, GUI 700 may specify event participants 712. In some embodiments, GUI 700 may include an interactive element for starting an associated event 716. In some embodiments, GUI 700 may include visual elements and/or interactive elements 720a, 720b, and 720c describing system data such as entity data. In some embodiments, an interactive element such as 720a or 720b may describe a recognition datum, such as shoutouts given, shoutouts received, and/or a value associated with shoutouts given and/or received. In some embodiments, GUI 700 may describe a measure of entity performance such as an interaction rating, statistics associated with interaction ratings, and/or narrative elements associated with an interaction rating, as in 720c. In some embodiments, one or more elements of GUI 700 may be selected. In a non-limiting example, an interactive element such as 720a may be selected, and additional details 724 relevant to element 720a may be displayed. In some embodiments, GUI 700 may include an interactive field 728 for entity input such as event notes. In some embodiments, the interactive field 728 is searchable by the entity or a $3^{rd}$ party user via a search function.

Still referring to FIG. 7, in a non-limiting example, GUI 700 may include history of shoutouts given and received, as well as CSAT reviews received in the additional details 724. In this example, an entity may see key indicators for each data point, including the number of shoutouts given and received, the number of points given and received, and the trend from the previous meeting. GUI 700 may be configured to allow the entity to search for shoutout history. In this example, an entity may also see the total number of CSAT reviews and a breakdown of positive, neutral, and negative reviews. In this example, clicking on any of the key indicators may display more detailed data and list all shoutouts given and received, as well as all CSAT reviews. In some embodiments, GUI 700 may include an activity tab displaying data representing all activity for the user that has occurred since the last event.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
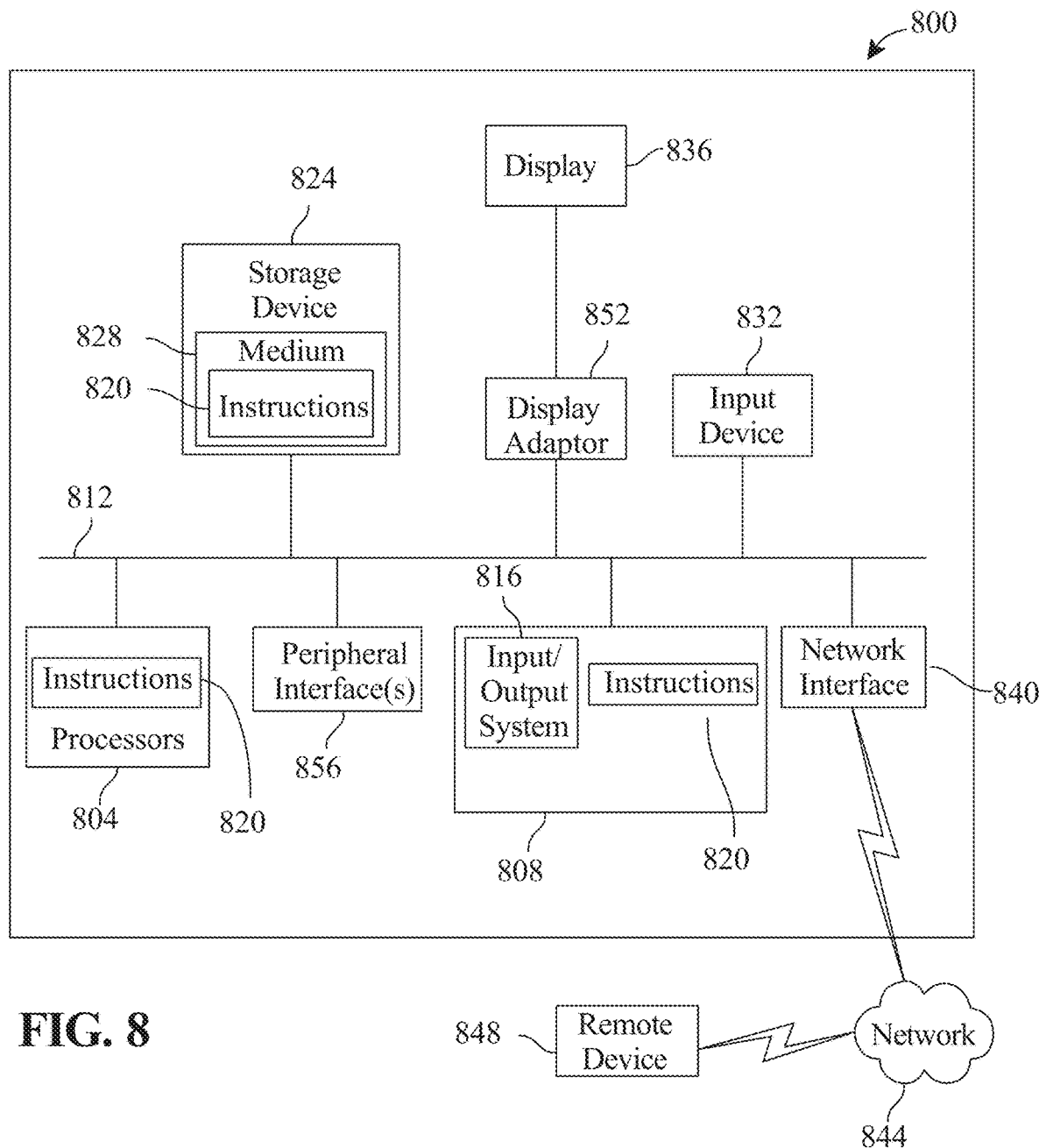
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automating interactions, the apparatus comprising:
   at least a processor; and
   a memory communicatively connected to the at least processor, the memory containing instructions configuring the at least processor to:
   gather system data, wherein the system data comprises entity data, wherein the system data further comprises an interaction rating associated with an entity, and wherein gathering the system data further comprises determining event activation data as a function of the interaction rating;
   preprocess the system data using at least a feature extraction process;
   using a time datum language model, determine event activation data as a function of the system data, wherein the event activation data comprises a time datum, wherein the time datum language model is trained on a dataset comprises historical event notes as input correlated to time datum outputs;
   execute an event by communicating the event activation data to an external device; and
   update the system data as a function of the execution of the event.

2. The apparatus of claim 1, wherein the system data comprises a recognition datum associated with an entity, wherein the memory contains instructions configuring the at least processor to determine event activation data as a function of the recognition datum.

3. The apparatus of claim 1, wherein determining event activation data as a function of the system data is done as a function of a datum selected from a list consisting of a user retention datum, a recognition datum, a measure of entity performance, and a measure of entity engagement.

4. The apparatus of claim 1, wherein:
   the system data comprises a recording of a prior event; and
   determining event activation data comprises:
   inputting the recording into an automatic speech recognition model;
   receiving from the automatic speech recognition model a transcript of the prior event; and
   determining a time datum language model input as a function of the transcript of the prior event.

5. The apparatus of claim 1, wherein:
   the system data comprises an image of event notes from a prior event; and
   determining event activation data comprises:
   inputting the event notes into an optical character recognition model;
   receiving from the optical character recognition model the event notes from the prior event in a non-image format; and
   determining a time datum language model input as a function of the event notes from the prior event in a non-image format.

6. The apparatus of claim 3, wherein the memory contains instructions configuring the at least a processor to, if time datum is not produced by time datum language model:
   input an item from the list consisting of an interaction rating, a recognition datum, and a key performance indicator into a time datum modification machine learning model; and
   receive from the time datum modification machine learning model the time datum.

7. The apparatus of claim 1, wherein the external device comprises a computing device associated with an event server, wherein communicating the event activation data to the external device comprises configuring the external device to create an event datum at a time associated with the event activation data.

8. The apparatus of claim 1, wherein the external device comprises a user device, wherein communicating the event activation data to the external device comprises configuring the external device to display a visual element that a user can interact with to send an invite at a time associated with the event activation data.

9. The apparatus of claim 6, wherein determining event activation data comprises:
   inputting into an event template machine learning model an item from the list consisting of a key performance indicator, an interaction datum, and an entity role; and
   receiving from the event template machine learning model a datum identifying an agenda template.

10. A method of automating interactions, the method comprising:
    using at least a processor, gathering system data, wherein the system data comprises entity data, wherein the system data further comprises an interaction rating associated with an entity, and wherein gathering the system data further comprises determining event activation data as a function of the interaction rating;
    using the at least a processor, preprocessing the system data using at least a feature extraction process;
    using a time datum language model and at least a processor, determining event activation data as a function of the system data, wherein the event activation data comprises a time datum, wherein the time datum language model is trained on a dataset comprises historical event notes as input correlated to time datum outputs;
    using at least a processor, executing an event by communicating the event activation data to an external device; and
    using at least a processor, updating the system data as a function of the execution of the event.

11. The method of claim 10, wherein the system data comprises a recognition datum associated with an entity, wherein the method further comprises determining event activation data as a function of the recognition datum.

12. The method of claim 10, wherein determining event activation data as a function of the system data is done as a function of a datum selected from a list consisting of a user retention datum, a recognition datum, a measure of entity performance, and a measure of entity engagement.

13. The method of claim 10, wherein:
    the system data comprises a recording of a prior event; and
    determining event activation data comprises:
    inputting the recording into an automatic speech recognition model;
    receiving from the automatic speech recognition model a transcript of the prior event; and
    determining a time datum language model input as a function of the transcript of the prior event.

14. The method of claim 10, wherein:
the system data comprises an image of event notes from a prior event; and
determining event activation data comprises:
inputting the event notes into an optical character recognition model;
receiving from the optical character recognition model the event notes from the prior event in a non-image format; and
determining a time datum language model input as a function of the event notes from the prior event in a non-image format.

15. The method of claim 12, wherein the method further comprises, if time datum is not produced by time datum language model:
inputting an item from the list consisting of an interaction rating, a recognition datum, and a key performance indicator into a time datum modification machine learning model; and
receiving from the time datum modification machine learning model the time datum.

16. The method of claim 10, wherein the external device comprises a computing device associated with an event server, wherein communicating the event activation data to the external device comprises configuring the external device to create an event datum at a time associated with the event activation data.

17. The method of claim 10, wherein the external device comprises a user device, wherein communicating the event activation data to the external device comprises configuring the external device to display a visual element that a user can interact with to send an invite at a time associated with the event activation data.

18. The method of claim 15, wherein determining event activation data comprises:
inputting into an event template machine learning model an item from the list consisting of a key performance indicator, an interaction datum, and an entity role; and
receiving from the event template machine learning model a datum identifying an agenda template.

\* \* \* \* \*